Jan. 13, 1970   D. JONES ET AL   3,488,861
TRAINING APPARATUS HAVING VISUAL DISPLAY SYSTEM
Filed May 17, 1967   3 Sheets-Sheet 1

DEREK JONES
RICHARD A. MECKLENBORG
EDWARD J. KITLER

INVENTORS

BY

DEREK JONES
RICHARD A. MECKLENBORG
EDWARD J. KITLER
INVENTORS

DEREK JONES
RICHARD A. MECKLENBORG
EDWARD J. KITLER

INVENTORS

United States Patent Office 3,488,861
Patented Jan. 13, 1970

3,488,861
TRAINING APPARATUS HAVING VISUAL
DISPLAY SYSTEM
Derek Jones and Richard A. Mecklenborg, Binghamton,
N.Y., and Edward J. Kitler, Nanticoke, Pa., assignors to Singer-General Precision, Inc., Binghamton,
N.Y., a corporation of Delaware
Filed May 17, 1967, Ser. No. 639,157
Int. Cl. G09b 9/02; G03b 35/02, 35/16
U.S. Cl. 35—11                                                              11 Claims

ABSTRACT OF THE DISCLOSURE

An image projection system including a projector, a screen in front of the projector; at least one screen to the rear of the projector and an optical system defining the projection path and selectively operative to direct the projection beam alternatively to either the front of rear screen.

This invention relates to apparatus for training and/or testing one or more operators of vehicles capable of forward and reverse motion.

PRIOR ART

Inasmuch as the operation of vehicles such as automobiles, motorcycles, bicycles and the like upon a public thoroughfare by an untrained operator is inherently dangerous, there are obvious advantages in providing a vehicle simulating training apparatus for initially training and testing inexperienced operators prior to their undertaking the control of an actual vehicle as well as for retraining and retesting of experienced operators. In recognition of this fact a considerable body of prior art has developed directed to the provision of apparatus for simulating actual vehicles and the conditions which would normally be encountered in the use of such an actual vehicle. Apparatus of this type which simulates an automobile are commercially available and are commonly referred to as "driver trainers." In the interests of clarity and literary ease, the present invention will be described with reference to an automobile simulator although it will be appreciated that it is not necessarily limited in its application to this particular type of vehicle.

For the most part, the majority of the prior art driver trainers include an operator's station crudely resembling the forward portion and driver's seat of a conventional motor vehicle, including the normal operating controls and dashboard instruments which may be and usually are physically identical to those of an operational vehicle; moreover, by means of electrical and/or mechanical arrangements, the dashboard instruments are made to respond properly and realistically to the manipulation of the operating controls.

In service, a motion picture projection screen is positioned in front of one or group of driver trainer units. Specially prepared motion picture sequences are projected on the screen and present to the student drivers traffic situations normally encountered in actual vehicle operation. Each student operates the controls of his simulated vehicle in response to the traffic situation depicted on the screen and his skill and reaction time in response to the problem are monitored and/or indicated.

It is well known that the degree of realism achieved is an important factor in the teaching effectiveness of simulator training devices In driver trainers, perhaps the biggest obstacle to the attainment of satisfactory realism has been the problem of providing visual simulation of vehicle motion in both the forward and reverse directions.

One approach to the solution of this problem has been to provide a mirror, adjacent to the side or immediately behind each student station, in which the student can view the scene projected on a screen disposed forwardly of the student station. This arrangement, however, has certain disadvantages which detract seriously from the realism achieved. Where the side mirrors are used it is not possible to provide a realistic impression of certain situations such as parking an actual vehicle parallel to a curb; with the mirror positioned behind the operator to view the scene projected in front of the trainer, the physical presence of the operator himself blanking out a significant area of the scene greatly detracts from the realism of the situation. In both cases, despite the fact that the operator is looking toward the rear or the sides to view the screen, there nevertheless is an awareness of the scene on the screen in addition to the image thereof being viewed in the mirrors.

One significant improvement over the mirror arrangement described above is disclosed and claimed in U.S. Letters Patent No. 3,205,592 issued to W. W. Wood, Jr. In the training apparatus of Wood two projection screens are provided: one disposed forwardly of the trainer vehicles and one to the rear; the projection system includes a movable reflecting element which can be selectively displaced between two positions one of which permits projection of the image to the front screen and the other deflecting the projection beam to the rear screen.

STATEMENT OF THE INVENTION

The present invention contemplates training apparatus of the same general type as that disclosed in the aforementioned patent but having an improved projection system. More particularly, the invention contemplates a teaching apparatus comprising a student station, a plurality of display surfaces spaced about the station for receiving and displaying a projected image, and an image projector having a projection axis along which an image-carrying beam is projected. Reflector means are provided to control the path of the projection beam, including a reflecting surface disposed in skewed relation to, and intersecting, the projection beam axis and mounted for rotation about such axis.

In accordance with a particular feature of the invention, three display surfaces are provided, one directly in front of the student station or group of stations and one each to the left rear and right rear of the station or group of stations. With this arrangement, the rotatably mounted reflector means may assume any one of three distinct positions, respectively, to direct the projection beam to any one of the three display surfaces.

OBJECTS OF THE INVENTION

It is the fundamental object of the present invention to provide novel training/testing apparatus which overcomes or mitigates at least one of the problems of the prior art as outlined above.

Another object of the invention is the provision of a simulated vehicle training/testing apparatus operable to simulate realistically the visual aspects of problems relating to simulated rearward motion as well as simulated forward motion.

Still another object of the invention is to provide, in a simulated vehicle training/testing apparatus, a visual display system including an improved arrangement for directing a projected image from a single motion picture projector to any one of a plurality of projection screens disposed about the trainee position.

A further object is the provision of simulated vehicle training apparatus including a visual display for both forward and reverse operation of the vehicle which is far more realistic with respect to rearward operation than heretofore.

A still further object is the provision of training apparatus as characterized in the preceding objects which is simple in construction, reliable in operation, and relatively low in cost.

The invention accordingly comprises the features of construction, combination of elements and arrangements of parts, which will be exemplified in the construction hereinafter set forth; the scope of the invention will be indicated in the subjoined claims.

For an understanding of the nature, scope and further objects of the invention reference should be had to the following detailed description taken in conjunction with the annexed drawings in which.

In the detailed description to follow it should be understood that the preferred embodiment is illustrated as including one or more operator-trainee stations or "cars" each equipped with a number of simulated control devices for operation by the student such as, by way of example, an accelerator pedal, brake pedal, steering wheel, transmission shift lever, and a clutch if a manual transmission rather than automatic transmission is to be simulated, together with a plurality of simulated indicator gauges or dashboard instruments such as a speedometer, fuel gauge, oil pressure gauge, temperature gauge or the like. Further, a single projector is provided to present upon a projection screen or other display surfaces a sequence of scenes presenting to the trainees a series of problems or tests, the reaction of the trainee thereto being determined by monitoring and indicating the trainees operation of the simulated control devices in relation to the specific problem presented.

Although the present invention may be utilized in conjunction with more complex training apparatus such as those which include a closed-circuit projection television system wherein the television camera is positioned to view a simulated highway scene and is moved relative thereto in response to the trainees operation of the simulated controls, in order to emphasize the primary feature of the invention, viz., a realistic visual simulation of problems involving a forward and reverse motion, the invention will be described with reference to a simpler type of training apparatus such as that disclosed in the aforementioned patent and in U.S. Letters Patent No. 3,266,173 issued to G. H. Sheridan to which reference may be had for additional and more detailed information as to the general construction and operation of the training devices.

Figure 1:
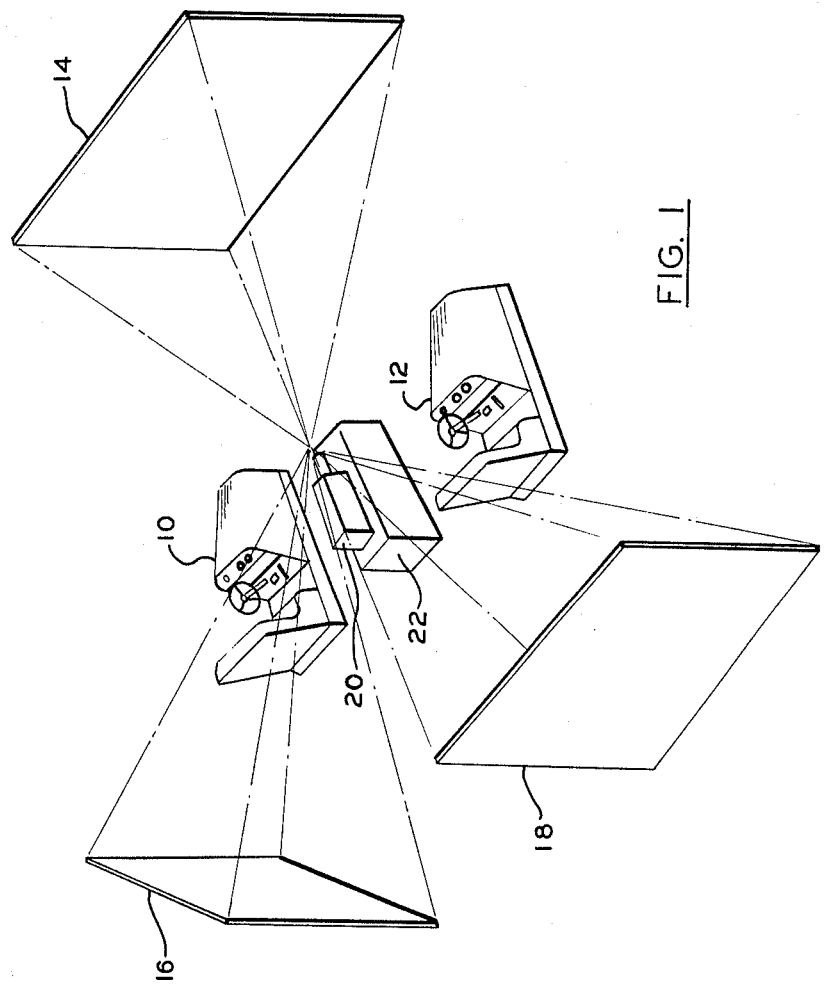
FIG. 1 is a perspective view illustrating the general arrangement of a preferred embodiment of the apparatus contemplated by the invention.

Referring now to the drawing and, first, in particular, to FIG. 1, there is illustrated in somewhat diagrammatic form the general arrangement of the apparatus contemplated by the invention. The particular apparatus shown includes two "cars" generally indicated as 10 and 12 but it will be understood that a single car or a greater number than two may be utilized in any given installation. Disposed about the car or group of cars are a plurality of display surfaces 14, 16 and 18 which would normally be provided by conventional projection screens. Surface 14 is located directly ahead as viewed from the cars and, for ease of reference, will be termed the front screen. Normally, when used in connection with a group of cars, front screen 14 would be symmetrically disposed relative to the locale of the group.

In the illustrated embodiment, the two additional display surfaces 16 and 18 are disposed rearwardly of the locale of the cars, one laterally displaced to the left and the other to the right with respect to a plane perpendicular to and passing through the vertical centerline of front screen 14. For ease of reference surfaces 16 and 18 may be referred as the back or rear screens.

It will be noted that rear screens 16 and 18 are not parallel to front screen 14 but make an acute angle relative to the aforementioned plane through the vertical centerline of the front screen. The reason for this angulation will become apparent as this description proceeds from which it will be seen that the degree of angulation is by no means critical and that, if necessary or desired, the rear scenes may be placed parallel to the front screen. It will also be noted that a single rear screen may be used as is done in the aforementioned U.S. Patent No. 3,205,592.

In a generally central location with respect to car units 10 and 12 and display surfaces 14, 16, 18 is a generally conventional motion picture projector 20 mounted on a table 22 or other suitable support giving it the proper height relative to the projection screens. Projector 20 is provided with a projection system, not shown in FIG. 1 because of scale limitations, which is operable to direct the projection beam selectively to any one of the screens shown in the FIG. 1 arrangement or to even a greater number of such screens if desired.

Figure 2:
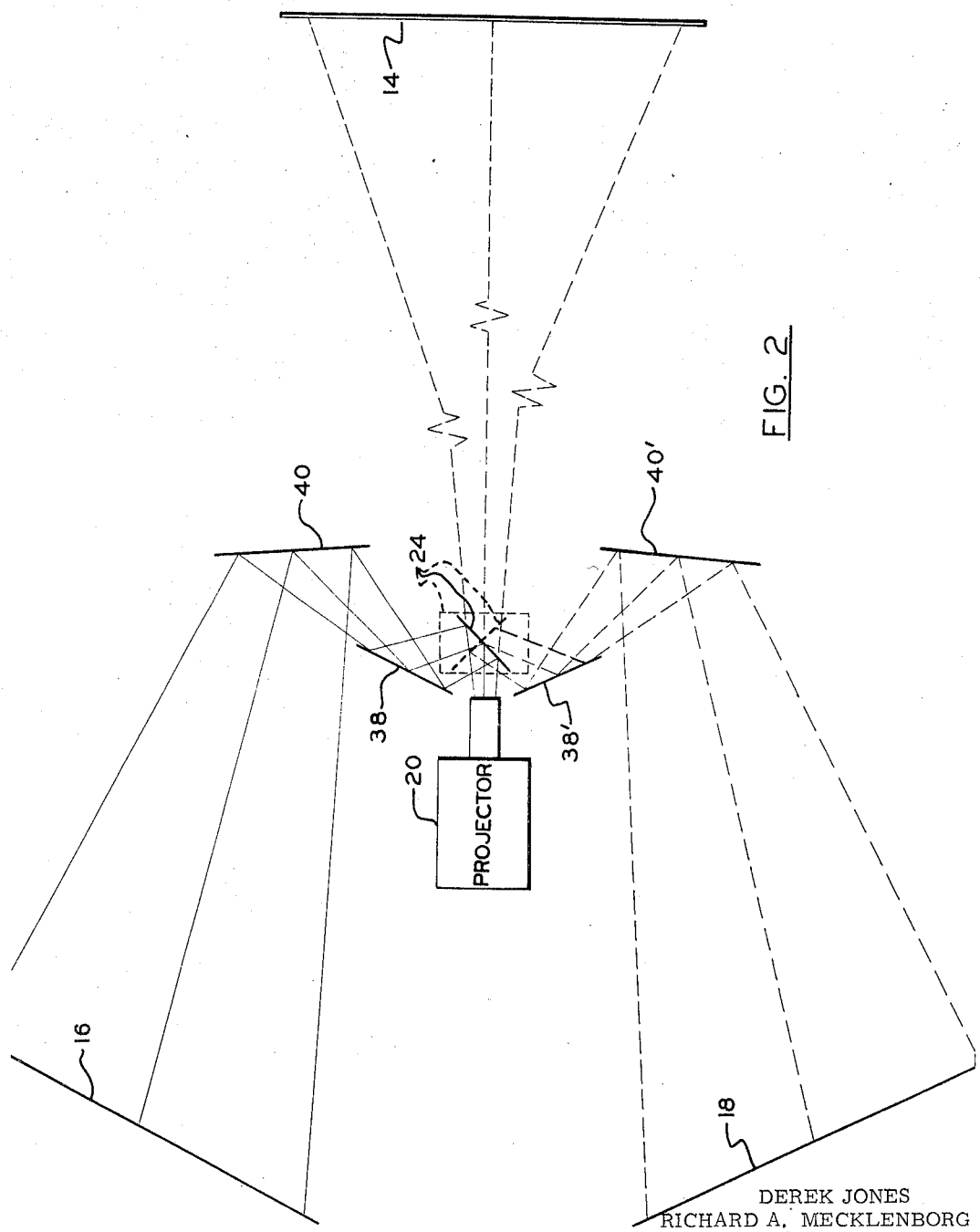
FIG. 2 is a diagrammatic view of the projection system shown in FIG. 1 as viewed from above with a component omitted to show underlying structure.
Figure 3:
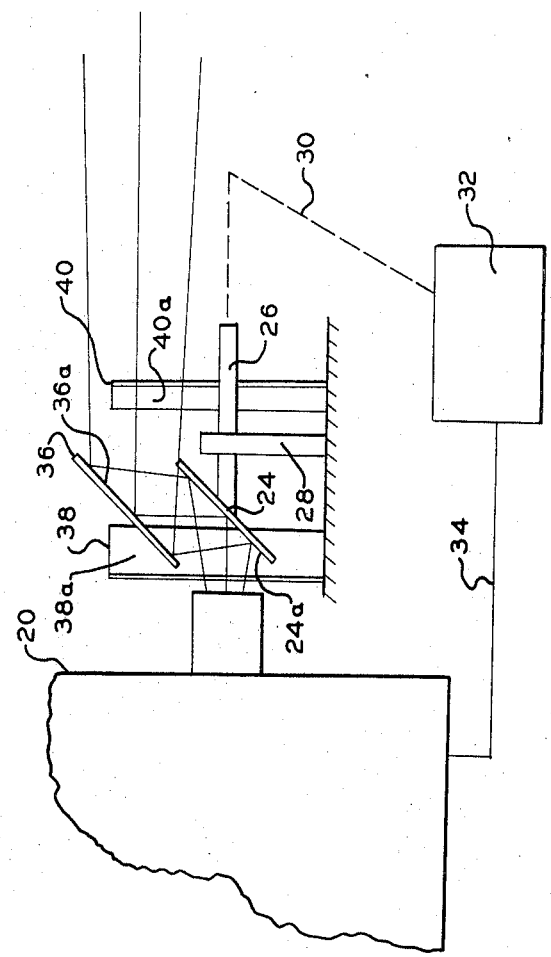
FIG. 3 is a fragmentary side view of the projection system shown in FIG. 2 on an enlarged scale and with the omitted component in place.

The projection system is illustrated in FIGS. 2 and 3 and consists of an arrangement of fixed and movable reflecting elements such as mirrors, prisms or the like. In the illustrated embodiment mirrors are employed, as would almost always be the case in actual practice due to economic considerations.

The basic element of the projection system is a reflector represented by mirror 24 disposed in front of projector in a position to intercept the projection beam. As best appears in FIG. 3, the reflecting surface 24a of mirror 24 is in skewed relation to the axis of the projection beam intercepting that axis at an acute angle which, in the illustrated embodiment is, and most actual cases would be, 45 degrees. Mirror 24 is mounted for angular displacement about the projection beam axis by any suitable means indicated schematically in FIG. 3 as a rod 26 having mirror 24 secured to one end; the rod is mounted coaxially with the projection beam axis for rotation about such axis in a bearing-support member 28. From the structure thus far described it will be appreciated that rotation of rod 26 causes rotational displacement of mirror 24 about the projection beam axis while the skew angle between the mirror and axis remains essentially constant. As indicated by broken line 30 connecting rod 28 to a control device 32 which, in turn, is electrically coupled as indicated by a conductor 34, to projector 20, rotation of mirror 24 is under the control of, and correlated with, the image being projected all in a manner and for the purposes which will hereinafter become apparent.

Disposed laterally of the projection beam and also in skewed relation to the projection beam axis is a second reflector shown as a mirror 36 (omitted from FIG. 2). As indicated by the ray traces in FIG. 3, the reflecting surface 36a of the second mirror is so disposed with respect to mirror 24 that the projection beam reflected by mirror 24 to mirror 36 is again reflected and directed toward front projection screen 14. In the illustrated embodiment, the reflecting surface 36a of the second mirror is located above the projection beam and at an angle of 45 degrees to the projection beam axis and, therefore, parallel to reflecting surface 24a when mirror 24 is in the position shown in FIG. 3. It will be appreciated, therefore, that the projection beam will be projected to front screen 14 when, and only when, mirror 24 is in the position shown in FIG. 3, which position, for ease of reference, will be termed the "neutral" position.

Also laterally disposed with respect to the projection beam and at a position angularly displaced about the projection beam axis from the location of mirror 36 is a third reflector in the form of a mirror 38 having its reflecting surface 38a positioned to intercept and reflect the beam previously reflected by mirror 24 when the latter is in a position displaced from the neutral position. In the exemplary system being described, reflecting surface 38a is in a vertical plane skewed with respect to the projection beam axis and disposed either parallel or at a small angle to mirror surface 24a when mirror 24 is in a position rotated 90 degrees about the projection beam axis from the neutral.

As best seen in FIG. 2 still another reflector mirror 40 disposed laterally of the projection beam and at a greater distance therefrom than mirror 38. The location and orientation of reflecting surface 40a is such as to receive a beam reflected from the mirror surface 38a and to again reflect it to one of the rear projection screens, e.g., 16. In the exemplary embodiment, the reflecting surface of mirror 40 is in a substantially vertical plane and at a relatively large angle to the projection beam axis, although it will be understood that the plane of mirror surface 40a may be angularly displaced about either a horizontal or vertical axis as necessary to accommodate a given position of projection screen 16.

Mirrors 38 and 40 have counterparts designated by corresponding primed reference characters 38', 40' on the opposite side of the projection beam, defining an optical path to the other rear screen (18) for the projection beam when rotatable mirror 14 is displaced 90 degrees from the neutral position in a direction opposite to that already described.

While the rearwardly-directed projection paths on opposite sides of the projection beam axis would normally be symmetrical and mirror images of one another, it will be understood that this is not necessarily the case. Space limitations or other factors may dictate an unsymmetrical arrangement.

From the structure that far described it will be seen that rotatable mirror 24 has three distinct positions: (1) a neutral position, as shown in FIG. 3, which defines an optical path for the projection beam from the projector to front screen 14; (2) a second position displaced 90 degrees from the neutral in one direction to define an optical path from the projector to one of the rear screens (e.g., 16) by way of the mirrors 38 and 40 as shown in FIG. 2; and (3) a third position (shown in broken line in FIG. 2), angularly displaced by 90 degrees in the opposite direction from the neutral position and defining an optical path to the other rear screen (18) by way of mirrors 38' and 40'. It will be appreciated, however, that additional reflecting surfaces may be provided and/or the angles of the reflecting surfaces modified to provide additional and/or different particular optical paths.

As previously mentioned, the position occupied by mirror 24 at any given time is correlated to the scene being displayed by the projector 20 at that time. To this end the firm for the projector is provided with suitable means for signalling time when the images being displayed will require switching from one screen to the another. The signal may take the form of a code number recorded on the film sound track, whether it be optical or magnetic, or it may be as simple an expedient as a mechanical alteration to the film itself, such as a dimple or notch on the film or even a single blank (wholly transparent or opaque) frame. A sensor is provided to detect the particular form of indicator used and operates to generate a signal which is directed via conductor 34 to a suitable electrical mechanical device (represented by block 32), e.g., a solenoid, stepper motor, motor and microswitch assembly (or the like) connected to move mirror 24 rapidly from one position to another. For additional details as to the structure and operation of various ways for controlling the position of a movable mirror, reference may be had to the aforementioned U.S. Patents Nos. 3,205,592 and/or 3,266,173.

The operation of the apparatus is deemed to be self-evident from the foregoing description and may be briefly summarized as follows. With projector 20 displaying a scene corresponding to forward vehicle motion, rotatable mirror 24 is in its neutral position. Immediately prior to the start of an interval during which a problem or test requiring simulated reverse motion is to be presented, an indication is projected on the front screen advising the student that he should now view one or the other of the rear screens. After a momentary delay affording the students time to react, the coded segment of the film reaches the detector and actuates the mirror switching mechanism to terminate the projection on the forward screen and initiate projection of one or the other of the rear screens. In like manner, the projected scene and the students attention may be directed to the other rear screen, returned to the front screen, and generally switched in any conceivable sequence from one to another of the several screens.

It should be noted that during the reverse operation, the front screen is dark and does not serve as a distraction to the students nor detract from the realism of the display. It will also be noted that, inasmuch as there are an even number of mirrors in the optical path for forward projection and an odd number of mirrors in the paths for rear projection, the proper relationships among other objects in the projected scene is maintained for both forward and reverse viewing.

The embodiments of the invention in which an exclusive property or privilege is claimed are defined as follows:

1. Teaching apparatus of the type wherein a visual display is presented for viewing by the student and having a positional relationship to the student's location which is variable in accordance with the desired teaching application of said display, said apparatus comprising:
    (a) an image projector having a projection axis along which an image-carrying beam is projected;
    (b) a plurality of display surfaces upon which said beam may be projected and positioned both forwardly and rearwardly of said student's location; and
    (c) first reflector means having a reflecting surface movable between a first predetermined position, wherein said beam is totally intercepted by said first reflector means and reflected by the reflecting surface thereof for projection upon a first of said plurality of display surfaces located forwardly of said student's location, and a second predetermined position, wherein said beam is totally intercepted by said first reflector means and reflected by the reflecting surface thereof for projection upon a second of said plurality of display surfaces located rearwardly of said student's location.

2. Teaching apparatus according to claim 1 wherein said first reflector means is mounted with the reflecting surface thereof disposed at an angle to said projection axis and is movable between said first and second predetermined positions by rotation about said axis without substantial lateral or longitudinal movement.

3. Teaching apparatus according to claim 1, further comprising:
    second reflector means including a reflecting surface disposed laterally of said projection axis and located and oriented to intercept and reflect toward said first display surface a beam reflected by the first-mentioned reflector eans when rotated about said projection beam axis to said first predetermined position.

4. Teaching apparatus according to claim 3, further comprising:
    third reflector means including a reflecting surface disposed laterally of said projection axis at a location angularly displaced about said projection beam axis from said second reflector means and in a position to intercept and reflect toward said second display surface a beam reflected by said first reflector means when rotated about said projection beam axis to a second predetermined position.

5. Teaching apparatus according to claim 4 including means operative in response to signals correlated to the images projected by said projector for rotating the first reflector means between said first and second predetermined positions.

6. Teaching apparatus according to claim 5 wherein the reflecting surface of the second reflector means is substantially perpendicular to one plane and the third reflector means includes a pair of reflectors having a respective reflecting surfaces both substantially perpendicular to a second plane which in turn is substantially perpendicular to said one plane.

7. Teaching apparatus according to claim 6 wherein the reflecting surface of the first reflector means is substantially perpendicular to said one plane when the first reflector means is in said first predetermined position and substantially perpendicular to said second plane when the first reflector means is in said second predetermined position.

8. Teaching apparatus according to claim 7, further comprising:
fourth reflector means including a reflecting surface disposed laterally of said projection beam at a location angularly displaced about said projection beam axis from both said second and third reflector means and in a position to intercept and reflect toward a third one of said display surfaces a beam reflected by said first reflector means when rotated about said axis to a third predetermined position.

9. Teaching apparatus according to claim 8 wherein said third and said fourth reflector means each includes a pair of reflectors having respective reflecting surfaces substantially perpendicular to said second plane, said pairs of reflectors being disposed on opposite sides of said projection beam.

10. Teaching apparatus according to claim 9 wherein the reflecting surface of said first reflector means is substantially perpendicular to said second plane when the first reflector means is in said third predetermined position.

11. Teaching apparatus according to claim 10 wherein said second and third display surfaces are disposed on opposite sides of and spaced from said projection axis.

References Cited

UNITED STATES PATENTS

| 1,454,950 | 5/1923 | Boyle. | |
| 2,074,991 | 3/1937 | Salcedo | 353—82 |
| 3,257,899 | 6/1966 | Hoyt | 352—68 X |

EUGENE R. CAPOZIO, Primary Examiner

W. H. GRIEB, Assistant Examiner

U.S. Cl. X.R.
352—65; 353—82